United States Patent
Mossayebi et al.

(10) Patent No.: US 12,003,631 B2
(45) Date of Patent: *Jun. 4, 2024

(54) UNIQUE IDENTIFIERS BASED ON QUANTUM EFFECTS

(71) Applicant: Crypto Quantique Limited, London (GB)

(72) Inventors: Shahram Mossayebi, London (GB); Patrick Camilleri, London (GB); Henry Edward William Montagu, London (GB)

(73) Assignee: Crypto Quantique Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/118,694

(22) Filed: Mar. 7, 2023

(65) Prior Publication Data
US 2023/0353352 A1 Nov. 2, 2023

Related U.S. Application Data

(63) Continuation of application No. 16/755,405, filed as application No. PCT/GB2018/052086 on Jul. 25, 2018, now Pat. No. 11,621,840.

(30) Foreign Application Priority Data

Oct. 17, 2017 (GB) .................................. 1717056

(51) Int. Cl.
*H04B 10/00* (2013.01)
*G06N 10/00* (2022.01)
(Continued)

(52) U.S. Cl.
CPC ........... *H04L 9/0866* (2013.01); *G06N 10/00* (2019.01); *H01L 23/576* (2013.01); *H04B 10/07* (2013.01);
(Continued)

(58) Field of Classification Search
CPC ............................ H04L 9/3271; H04L 9/3278
See application file for complete search history.

(56) References Cited

U.S. PATENT DOCUMENTS 4,831,340 A 5/1989 Sollner
9,444,632 B2 9/2016 Pinkse et al.
(Continued)

FOREIGN PATENT DOCUMENTS

EP 2 819 049 A1 12/2014
GB 2543125 A 4/2017
(Continued)

OTHER PUBLICATIONS

International Search Report and Written Opinion for International Application No. PCT/GB2018/052086 dated Nov. 13, 2018.
(Continued)

*Primary Examiner* — Daniel G Dobson
(74) *Attorney, Agent, or Firm* — Wolf, Greenfield & Sacks, P.C.

(57) ABSTRACT

A method is provided for determining a unique identifier of a device, the device including a quantum tunnelling barrier unique to the device. The method comprises applying a potential difference across the quantum tunnelling barrier, the potential difference sufficient to enable tunnelling barrier. The method further comprises measuring an electrical signal, the electrical signal representative of a tunnelling current through the quantum tunnelling barrier. The method further comprises determining, from the measured electrical signal, a unique identifier for the device. Related apparatuses, systems, computer-readable media and methods are also provided herein.

20 Claims, 10 Drawing Sheets

(51) Int. Cl.
  *H01L 23/00* (2006.01)
  *H04B 10/07* (2013.01)
  *H04L 9/08* (2006.01)
  *H04L 9/32* (2006.01)
  *H01L 29/12* (2006.01)
  *H01L 29/423* (2006.01)
  *H01L 29/66* (2006.01)
  *H04J 14/00* (2006.01)

(52) U.S. Cl.
  CPC .......... *H04L 9/0852* (2013.01); *H04L 9/3278* (2013.01); *H01L 29/127* (2013.01); *H01L 29/42324* (2013.01); *H01L 29/66977* (2013.01)

(56) References Cited

U.S. PATENT DOCUMENTS

| | | | | |
|---|---|---|---|---|
| 11,621,840 | B2* | 4/2023 | Mossayebi | G06F 7/588 713/189 |
| 2014/0201851 | A1 | 7/2014 | Guo et al. | |
| 2015/0154421 | A1 | 6/2015 | Feng et al. | |
| 2017/0214532 | A1 | 7/2017 | Das et al. | |
| 2020/0186368 | A1* | 6/2020 | Roberts | H04L 9/3278 |
| 2020/0322144 | A1 | 10/2020 | Mossayebi et al. | |

FOREIGN PATENT DOCUMENTS

| | | |
|---|---|---|
| KR | 10-2012-0053190 A | 5/2012 |
| KR | 101576267 B1 | 12/2015 |
| KR | 10-2017-0007781 A | 1/2017 |

OTHER PUBLICATIONS

International Preliminary Report on Patentability for International Application No. PCT/GB2018/052086 dated Apr. 30, 2020.
Combined Search and Examination Report dated Mar. 12, 2018, for British Application No. GB1717056.4.
Indian Examination Report dated Aug. 19, 2022, in connection with Indian Application No. 202047020107.
Korean Office Action dated Jun. 28, 2022, in connection with Korean Application No. KR 10-10-2020-7013318.
[No Author Listed], Quantum Physics. University of California San Diego. Apr. 2, 2003:1-548.
Al-Ameri et al., Impact of quantum confinement on transport and the electrostatic driven performance of silicon nanowire transistors at the scaling limit. Solid-State Electronics. Mar. 1, 2017;129:73-80.
Amato et al., Beyond the limits of classic backscattering communications: A quantum tunneling RFID tag. 2017 IEEE International Conference on RFID (RFID) May 9, 2017:20-25.
Amelifard et al., Reducing the sub-threshold and gate-tunneling leakage of SRAM cells using dual-Vt and dual-Tox assignment. Proceedings of the Design Automation & Test in Europe Conference, IEEE. Mar. 6, 2006;1:6 pages.
Goorden et al., Quantum-Secure Authentication with a Classical Key. ArXiv preprint arXiv:1303.0142. Mar. 1, 2013;3:8 pages.
Guajardo et al., FPGA intrinsic PUFs and their use for IP protection. International workshop on cryptographic hardware and embedded systems, Springer. Sep. 10, 2007:63-80.
Helinski et al., A physical unclonable function defined using power distribution system equivalent resistance variations. 2009 46th ACM/IEEE Design Automation Conference. Jul. 26, 2009:676-681.
Hurd, Quantum tunnelling and the temperature dependent DC conduction in low-conductivity semiconductors. Journal of Physics C: Solid State Physics. Dec. 20, 1985;18(35):6487-6499.
Krishan et al., A Literature Review of Quantum Dots. International Journal of Advanced Research in Electrical, Electronics and Instrumentation Engineering. Sep. 2015;4:7857-7862.
Markov, Gate leakage variability in nano-CMOS transistors. Doctoral dissertation, University of Glasgow. 2009:178 pages.
Qian, Variability modeling and statistical parameter extraction for CMOS devices. Doctoral dissertation, UC Berkeley. 2015:156 pages.
Roberts et al., Using quantum confinement to uniquely identify devices. Scientific reports. Nov. 10, 2015;5:1-8.
Shokeir, Increasing the bit density from a quantum-confinement physically unclonable function. Masters Dissertation, Lancaster University. Jun. 21, 2017:69 pages.
Vandelli et al., A Physical Model of the Temperature Dependence of the Current Through SiO2/HfO2 Stacks. IEEE Transactions on Electron Devices. Jul. 11, 2011;58(9):2878-87.
Yang et al., Modeling study of ultrathin gate oxides using direct tunneling current and capacitance-voltage measurements in MOS devices. IEEE Transactions on Electron Devices. Jul. 1999;46(7):1464-71.
Yang et al., MOS capacitance measurements for high-leakage thin dielectrics. IEEE Transactions on Electron Devices. Jul. 1999;46(7):1500-1.
Korean Office Action dated Jun. 28, 2023, in connection with Korean Application No. 10-2020-7013318.
Tsoi et al. Compact FPGA-based true and pseudo random number generators. 11th Annual IEEE Symposium on Field-Programmable Custom Computing Machines. 2003. 11 pages.

* cited by examiner

UNIQUE IDENTIFIERS BASED ON QUANTUM EFFECTS

RELATED APPLICATIONS

This Application is a Continuation of U.S. application Ser. No. 16/755,405, filed Apr. 10, 2020, entitled "UNIQUE IDENTIFIERS BASED ON QUANTUM EFFECTS", which is a national stage filing under 35 U.S.C. 371 of International Patent Application Serial No. PCT/GB2018/052086, filed Jul. 25, 2018. Foreign priority benefits are claimed under 35 U.S.C. § 119(a)-(d) or 35 U.S.C. § 365(b) of British application number 1717056.4, filed Oct. 17, 2017. The entire contents of these applications are incorporated herein by reference in their entirety.

TECHNICAL FIELD

The present invention relates generally to the determination or generation of a unique identifier for a device. In particular, the present disclosure relates to the determination or generation of a unique identifier for a device by utilising a quantum tunnelling effect.

BACKGROUND

Networks such as the Internet have changed the way that everyday tasks are carried out, and this has had major implications for information security. Many everyday tasks require digital devices to securely authenticate and be authenticated by another party and/or securely handle private information. In a world in which an identifier is physically available to the authenticator this is a trivial issue—for example a bank teller may be able to authenticate a bank customer in a bank branch by checking the customer's passport or other identifying documents. However, the situation is far more complicated if the customer's identifying documents are not immediately available, for example when a customer is provided with an online banking service. The bank must ensure that the correct customer is given access to the correct resources and information. But how can the bank secure the communication link to the customer across a network to prevent eavesdropping or tampering with data, and how can the customer be certain that he or she is connected to their banking service and not an impersonator?

There are many cryptographic applications that may be employed to address such issues, for example digital signatures or other secret cryptographic keys. In order to provide a secure memory or authentication source, one commonplace method is to place a cryptographic key in a non-volatile electrically erasable programmable read-only memory (EEPROM) or battery backed static random access memory (SRAM) and to use cryptographic operations such as digital signatures or encryption. However, such approaches are often time consuming and can be costly in terms of power consumption. In addition, non-volatile memory is often vulnerable to invasive attacks in which the cryptographic key can be taken. If a stolen cryptographic key is used by a third party in, for example, a bank transaction, the bank would have no immediate way of knowing that the key was being fraudulently used by the third party and so may allow such a fraudulent transaction to proceed.

Accordingly, it is desirable to be able to uniquely identify a device/apparatus associated with a user such that, without the device/apparatus, certain operations or transactions may not proceed. That is, it is desirable to be able to "fingerprint" a device. Such a fingerprint or identifier must be difficult to clone and largely invariant to environmental factors so that whenever the identity of the device is queried a robust and faithful answer is returned.

Physically unclonable functions (also known as physical unclonable functions or PUFs) are a cryptographic primitive that are used for authentication and secret key storage without the requirement of secure EEPROMs and other expensive hardware. Instead of storing secrets in digital memory, PUFs derive a secret from the unique physical characteristics of a device, usually introduced during manufacture. Known PUFs are provided on the basis of what would commonly be considered to be classical or macroscopic physics, such as the scattering of laser light through a sheet of hardened epoxy in which tiny silica spheres are suspended, or manufacturing variability in gate delay in some circuits. However, as technology progresses there is a need for ever smaller devices, and PUFs based on such designs are difficult to scale down.

It is an object of embodiments of the invention to at least mitigate one or more of the problems of the prior art.

SUMMARY

According to an aspect of the invention, a method is provided for determining a unique identifier of a device. The device includes a quantum tunnelling barrier unique to the device. The method comprises applying a potential difference across the quantum tunnelling barrier, the potential difference sufficient to enable tunnelling of charge carriers through the quantum tunnelling barrier. The method further comprises measuring an electrical signal, the electrical signal representative of a tunnelling current through the quantum tunnelling barrier, the tunnelling current characteristic of the quantum tunnelling barrier. The method further comprises determining, from the measured electrical signal, a unique identifier for the device.

Determining a unique identifier may comprise generating a unique identifier. For example, an authenticator may generate a unique identifier for a device for storing. Determining a unique identifier may comprise verifying a unique identifier. For example, an authenticator may determine the unique identifier of the device in order to verify the device.

A method for determining a unique identifier of a device as described herein advantageously allows for security issues such as verification to be addressed even as devices are scaled down towards the nanoscale. Counter-intuitively, the quantum tunnelling effect, which is often seen as a source of loss or noise in a system or component, is instead used to the advantageous effect of allowing a device to be identified. Furthermore, the methods and devices described herein are largely invariant to environmental effects such as temperature change and so can be reliably used to identify a device.

Additionally, the nanoscale, molecular, or atomic scale structure of a quantum tunnelling barrier is very difficult to tamper with and so the use of a quantum tunnelling current to derive a unique identifier for a device allows for reliable device authentication. In contrast, other (classical) PUFs, such as an SRAM-PUF, can be tampered with by shining light on cells of the SRAM-PUF.

The device may include a single/only one/fewer than two quantum tunnelling barriers. That is the potential difference may be applied across only a single quantum tunnelling barrier to derive a unique identifier. The unique identifier of the device may be derived from a tunnelling current through a quantum tunnelling barrier of a device in which there is no quantum confinement. Other embodiments are envisaged, as will be explained in further detail below, in which devices comprise multiple quantum tunnelling barriers, and yet the unique identifier in those devices is also not dependent on a characteristic of quantum confinement in those devices.

The quantum tunnelling barrier may have an average thickness of less than or equal to five nanometres.

The method may further comprise providing the unique identifier for use in a communication protocol or a data transaction. The unique identifier may be used in encrypting or securing or authenticating an aspect of the communication protocol or data transaction. The method may comprise providing the unique identifier as a digital identifier of a physical object or a digital object. The method may comprise using the unique identifier in a communication protocol or a data transaction and/or using the unique identifier as a digital identifier of a physical object or a digital object.

The quantum tunnelling barrier of the device may be physically unclonable. Characteristics of the quantum tunnelling barrier revealed by the measured electrical signal may result from one or more distinctive nanoscale properties of the device that arise from device-to-device variability between ostensibly identical devices produced by the same semiconductor manufacturing process. The distinctive nanoscale properties that are variable from device-to-device may be beyond the control of a semiconductor manufacturing process used to produce the device.

Measuring of the electrical signal may be performed so as to be sufficient to reveal characteristics of the quantum tunnelling barrier that result from one or more distinctive nanoscale properties of the device that arise from device-to-device variability between ostensibly identical devices produced by the same semiconductor manufacturing process.

The method may further comprise applying a same potential difference across a second quantum tunnelling barrier of an ostensibly identical device, and measuring an electrical signal representative of a second tunnelling current through the second quantum tunnelling barrier, wherein the electrical signals representative of tunnelling currents through the quantum tunnelling barrier of the ostensibly first and second devices are different. The method may further comprise determining a second unique identifier for the ostensibly identical second device.

The method may further comprise storing the unique identifier.

The method may further comprise comparing the unique identifier of the device with a database containing the unique identifier for the device and unique identifiers for other devices. Each of the other devices may include a quantum tunnelling barrier unique to that other device.

The method may further comprise, prior to applying the potential difference, receiving a challenge from a third party. The challenge from the third party may take any suitable form, for example a command signal or instruction, which may be related to the strength of the applied potential difference. The strength of the applied potential difference may itself be considered as a challenge. The device may comprise or form part of a physically unclonable function and the unique identifier may be a unique identifier of the physically unclonable function or may be used to establish a unique identifier of the physically unclonable function. The method may further comprise communicating the unique identifier to the third party in response to the challenge.

Determining a unique identifier for the device may comprise determining a mean value of the tunnelling current.

Measuring an electrical signal may comprise measuring an electrical signal multiple times, and determining a unique identifier for the device may comprise interpolating a current spectrum from the multiple measurements of the electrical signal.

Measuring an electrical signal may comprise measuring the tunnelling current. Measuring an electrical signal may comprise measuring a leakage current of the device. Measuring an electrical signal may comprise measuring a resistance.

The charge carriers may be electrons. The charge carriers may be quasiparticles such as holes.

According to an aspect of the invention, a computer-readable medium is provided. The computer-readable medium has instructions stored thereon which, when executed by a processor, cause the processor to determine a unique identifier of a device by performing a method as disclosed herein. The computer-readable medium may be a non-transitory computer-readable medium.

According to an aspect of the invention, a device is provided. The device comprises a first terminal and a second terminal. The device further comprises a quantum tunnelling barrier unique to the device, the quantum tunnelling barrier located between the first terminal and the second terminal. The device further comprises a processor configured to apply a potential difference between the first terminal and the second terminal and across the quantum tunnelling barrier, the potential difference sufficient to enable tunnelling of charge carriers through the quantum tunnelling barrier. The processor is further configured to measure an electrical signal, the electrical signal representative of a tunnelling current through the quantum tunnelling barrier, the tunnelling current characteristic of the quantum tunnelling barrier. The device is further configured to determine, from the measured electrical signal, a unique identifier for the device.

The device may comprise a complementary metal-oxide-semiconductor, CMOS, chip.

The device may comprise a single unique quantum tunnelling barrier.

The quantum tunnelling barrier may have an average thickness of less than or equal to five nanometres. For example, the quantum tunnelling barrier may have an average thickness of less than or equal to three nanometres.

The quantum tunnelling barrier of the device may be physically unclonable. The characteristics of the quantum tunnelling barrier revealed, in use, by the measured electrical signal may result from one or more distinctive nanoscale properties of the device that arise from device-to-device variability between ostensibly identical devices produced by the same semiconductor manufacturing process. The distinctive nanoscale properties that are variable from device to device may be beyond the control of a semiconductor manufacturing process used to produce the device.

The processor may be configured such that the measurement of the electrical signal is performed so as to be sufficient to reveal characteristics of the quantum tunnelling barrier that result from one or more distinctive nanoscale properties of the device that arise from device-to-device variability between ostensibly identical devices produced by the same semiconductor manufacturing process.

The device may further comprise a doped semiconductor channel between the first terminal and the second terminal. The tunnelling current may be dependent on a random dopant distribution within the doped semiconductor channel.

The tunnelling current may be dependent on atomic-scale oxide-thickness variation (OTV) of the quantum tunnelling barrier. The tunnelling current may be dependent on line edge roughness (LER) of the quantum tunnelling barrier.

The processor may be further configured to, prior to applying the potential difference, receive a challenge from a third party. The processor may further be configured to communicate the unique identifier to the third party in response to the challenge.

The device may comprise a physically unclonable function. the unique identifier may be a unique identifier of the physically unclonable function. The device may form a part of a physically unclonable function.

The charge carriers may be electrons. The charge carriers may be quasiparticles, such as holes.

The device may further comprise a power supply for applying the potential difference.

According to an aspect of the invention, a wafer or substrate is provided. The wafer comprises a plurality of devices as described herein, wherein each device of the plurality of devices comprises a quantum tunnelling barrier unique to that device.

According to an aspect of the invention, two ostensibly identical devices are provided, the devices as disclosed herein and manufactured according to the same semiconductor manufacturing process. The processors of the device, when applying a same potential difference across the quantum tunnelling barriers thereof in use, measure different respective electrical signals representative of respective tunnelling currents through the quantum tunnelling barriers. The processors of the device may, in use, determining, from the measured electrical signals, different respective unique identifiers for the ostensibly identical devices. The two processors may be provided on a single integrated circuit component.

According to an aspect of the invention, use is disclosed of a device as claimed herein to provide a unique identifier for use in a communication protocol or a data transaction, optionally in encrypting or securing or authenticating an aspect thereof. The use may further comprise using the unique identifier in a communication protocol or a data transaction.

According to an aspect of the invention, a method for use in the production of devices for determining unique identifiers is provided. The method comprises providing semiconductor fabrication apparatus configured to operate a semiconductor production process for providing first and second terminals with a quantum tunnelling barrier therebetween, the semiconductor production process being selected so as to promote a measurable device-to-device variability between the quantum tunnelling barriers of ostensibly identical devices produced according to the semiconductor production process, the variability being caused by variations in the nanoscale properties of the devices beyond the control of the semiconductor production process. The method further comprises providing apparatus configured to provide a processor coupled to the terminals and configured to (i) apply a potential difference between the first terminal and the second terminal and across the quantum tunnelling barrier, the potential difference sufficient to enable tunnelling of charge carriers through the quantum tunnelling barrier, (ii) measure an electrical signal, the electrical signal representative of a tunnelling current through the quantum tunnelling barrier, the tunnelling current characteristic of the quantum tunnelling barrier, and (iii) determine, from the measured electrical signal, a unique identifier for the device. The method may further comprise operating the provided apparatus to manufacture a device for determining unique identifiers.

According to an aspect of the invention, a method is provided for determining a unique identifier of a transistor device. The transistor device comprises a source terminal, a drain terminal and a gate terminal, the gate terminal separated from the source terminal and the drain terminal by a quantum tunnelling barrier unique to the transistor device. A potential difference between the source terminal and the drain terminal is substantially zero. The method comprises applying a potential difference between the gate terminal and at least one of the source terminal and the drain terminal, the potential difference sufficient to enable tunnelling of charge carriers through the quantum tunnelling barrier. The method further comprises measuring a gate leakage electrical signal, the gate leakage electrical signal representative of a tunnelling current through the quantum tunnelling barrier, the tunnelling current characteristic of the quantum tunnelling barrier. The method further comprises determining, from the measured gate leakage electrical signal, a unique identifier for the transistor device.

The tunnelling current may further be characteristic of a semiconductor channel between the source terminal and the drain terminal. The gate terminal may be separated from the source and drain terminals by the quantum tunnelling barrier and the channel. The gate leakage signal may therefore be characteristic of the nanoscale properties of the channel, for example a random dopant distribution in the channel.

According to an aspect of the invention, a computer-readable medium is provided, the computer-readable medium having instructions stored thereon which, when executed by a processor, cause the processor to determine a unique identifier of a transistor device by performing a method as described herein.

According to an aspect of the invention, an apparatus is provided. The apparatus comprises a transistor device. The transistor device comprises a source terminal, a drain terminal and a gate terminal, the gate terminal separated from the source terminal and the drain terminal by a quantum tunnelling barrier unique to the transistor device. A potential difference between the source terminal and the drain terminal is operable to be substantially zero. The apparatus further comprises a processor configured to apply a potential difference between the gate terminal and at least one of the source terminal and the drain terminal, the potential difference sufficient to enable tunnelling of charge carriers through the quantum tunnelling barrier. The processor is further configured to measure a gate leakage electrical signal, the gate leakage electrical signal representative of a tunnelling current through the quantum tunnelling barrier, the tunnelling current characteristic of the quantum tunnelling barrier. The processor is further configured to determine, from the measured gate leakage electrical signal, a unique identifier for the transistor device.

According to another aspect of the invention, a method is provided for determining a unique identifier of a capacitor device. The capacitor device comprises a first terminal and a second terminal, and further comprises a quantum tunnelling barrier disposed between the first and second terminals. The method comprises applying a potential difference between the first terminal and the second terminal, the potential difference sufficient to enable tunnelling of charge carriers through the quantum tunnelling barrier. The method further comprises measuring a gate leakage electrical signal, the gate leakage electrical signal representative of a tunnelling current through the quantum tunnelling barrier, the tunnelling current characteristic of the quantum tunnelling barrier. The method further comprises determining, from the measured gate leakage electrical signal, a unique identifier for the capacitor device.

According to another aspect of the invention, a computer readable medium is provided, the computer readable medium having instructions stored thereon which, when executed by a processor, cause the processor to determine a unique identifier of a capacitor device by performing a method as described herein.

According to another aspect of the invention, an apparatus is provided. The apparatus comprises a capacitor device and a processor. The capacitor device comprises a first terminal and a second terminal and a quantum tunnelling barrier disposed between the first terminal and the second terminal. The processor is configured to apply a potential difference between the first terminal and the second terminal, the potential difference sufficient to enable tunnelling of charge carriers through the quantum tunnelling barrier. The processor is further configured to measure a gate leakage electrical signal, the gate leakage electrical signal representative of a tunnelling current through the quantum tunnelling barrier, the tunnelling current characteristic of the quantum tunnelling barrier. The processor is further configured to determine, from the measured gate leakage electrical signal, a unique identifier for the capacitor device.

According to another aspect of the invention, a method is provided for determining a unique identifier of a quantum dot transistor device. The quantum dot transistor device comprises a source terminal, a drain terminal, a quantum dot film between the source terminal and the drain terminal, a first gate terminal, and a second gate terminal, the first gate terminal separated from the source terminal and the drain terminal by a first quantum tunnelling barrier unique to the quantum dot transistor device, the second gate terminal separated from the source terminal and the drain terminal by a second quantum tunnelling barrier unique to the quantum dot transistor device. A potential difference between the source terminal and the drain terminal is substantially zero. The method comprises applying a potential difference between the first gate terminal and at least one of the source terminal and the drain terminal, the potential difference sufficient to enable tunnelling of charge carriers through the quantum dot film and through the first quantum tunnelling barrier and through the second quantum tunnelling barrier. The method further comprises measuring a gate leakage electrical signal from the first gate terminal and/or the second gate terminal, the gate leakage electrical signal representative of a tunnelling current through the respective first and/or second quantum tunnelling barrier, the tunnelling current characteristic of the respective first and/or second quantum tunnelling barrier. The method further comprises determining, from the measured gate leakage electrical signal, a unique identifier for the quantum dot transistor device.

According to an aspect of the invention, a computer readable medium is provided, the computer readable medium having instructions stored thereon which, when executed by a processor, cause the processor to determine a unique identifier of a quantum dot transistor device by performing a method as described herein.

According to an aspect of the invention, an apparatus is provided. The apparatus comprises a quantum dot transistor device and a processor. The quantum dot transistor device comprises a source terminal and a drain terminal, the source terminal and the drain terminal separated by at least a quantum dot film. The quantum dot transistor device further comprises a first gate terminal separated from the source terminal and the drain terminal by a first quantum tunnelling barrier unique to the quantum dot transistor device (and optionally the quantum dot film). The quantum dot transistor device further comprises a second gate terminal separated from the source terminal and the drain terminal by a second quantum tunnelling barrier unique to the quantum dot transistor device (and optionally the quantum dot film). A potential difference between the source terminal and the drain terminal is operable to be substantially zero. The processor is configured to apply a potential difference between the first gate terminal and at least one of the source terminal and the drain terminal, the potential difference sufficient to enable tunnelling of charge carriers through the quantum dot film and through the first quantum tunnelling barrier and the second quantum tunnelling barrier. The processor is further configured to measure a gate leakage electrical signal from the first gate terminal and/or the second gate terminal, the gate leakage electrical signal representative of a tunnelling current through the respective first and/or second quantum tunnelling barrier, the tunnelling current characteristic of the respective first and/or second quantum tunnelling barrier. The processor is further configured to determine, from the measured gate leakage electrical signal, a unique identifier for the quantum dot transistor device.

According to another aspect of the invention, a method is provided for determining a unique identifier of a floating gate transistor device, the floating gate transistor device comprising a source terminal, a drain terminal, a control gate terminal and a floating gate terminal, the control terminal separated from the floating gate terminal by a first quantum tunnelling barrier unique to the device, the floating gate terminal separated from the source terminal and the drain terminal by a second quantum tunnelling barrier unique to the device. The method comprises applying a potential difference between the control gate terminal and at least one of the source terminal and the drain terminal, the potential difference sufficient to enable tunnelling of charge carriers through the second quantum tunnelling barrier. The method further comprises measuring a threshold voltage of the floating gate transistor device, the threshold voltage representative of a tunnelling current through the second quantum tunnelling barrier. The method further comprises measuring a gate leakage electrical signal, the gate leakage electrical signal representative of a tunnelling current through the first quantum tunnelling barrier and the second quantum tunnelling barrier. The method further comprises determining, from the measured threshold voltage and the measured gate leakage electrical signal, a unique identifier for the floating gate transistor device.

According to another aspect of the invention a computer readable medium is provided, the computer readable medium having instructions stored thereon which, when executed by a processor, cause the processor to determine a unique identifier of a floating gate transistor device by performing a method as described herein.

According to another aspect of the invention, an apparatus is provided. The apparatus comprises a floating gate transistor device and a processor. The floating gate transistor device comprises a source terminal. The floating gate transistor device further comprises a drain terminal. The floating gate transistor device further comprises a floating gate terminal separated from the source terminal and the drain terminal by a second quantum tunnelling barrier. The floating gate transistor device further comprises a control gate terminal separated from the floating gate terminal by a first quantum tunnelling barrier. A potential difference between the source terminal and the drain terminal is operable to be substantially zero. The processor is configured to apply a potential difference between the control gate terminal and at least one of the source terminal and the drain terminal, the potential difference sufficient to enable tunnelling of charge carriers through the second quantum tunnelling barrier. The processor is further configured to measure a threshold voltage of the floating gate transistor device, the threshold voltage representative of a tunnelling current through the second quantum tunnelling barrier. The processor is further configured to measure a gate leakage electrical signal, the gate leakage electrical signal representative of a tunnelling current through the first quantum tunnelling barrier and the second quantum tunnelling barrier. The processor is further configured to determine, from the measured threshold voltage and the measured gate leakage electrical signal, a unique identifier for the floating gate transistor device.

The computer program and/or the code for performing such methods as described herein may be provided to an apparatus, such as a computer, on the computer readable medium or computer program product. The computer readable medium could be, for example, an electronic, magnetic, optical, electromagnetic, infrared, or semiconductor system, or a propagation medium for data transmission, for example for downloading the code over the Internet. Alternatively, the computer readable medium could take the form of a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

Many modifications and other embodiments of the inventions set out herein will come to mind to a person skilled in the art to which these inventions pertain in light of the teachings presented herein. Therefore, it will be understood that the disclosure herein is not to be limited to the specific embodiments disclosed herein. Moreover, although the description provided herein provides example embodiments in the context of certain combinations of elements, steps and/or functions may be provided by alternative embodiments without departing from the scope of the invention.

BRIEF DESCRIPTION OF THE FIGURES

Embodiments of the invention will now be described by way of example only, with reference to the accompanying figures, in which.

Throughout the description and the drawings, like reference numerals refer to like parts.

DETAILED DESCRIPTION

Figure 1:
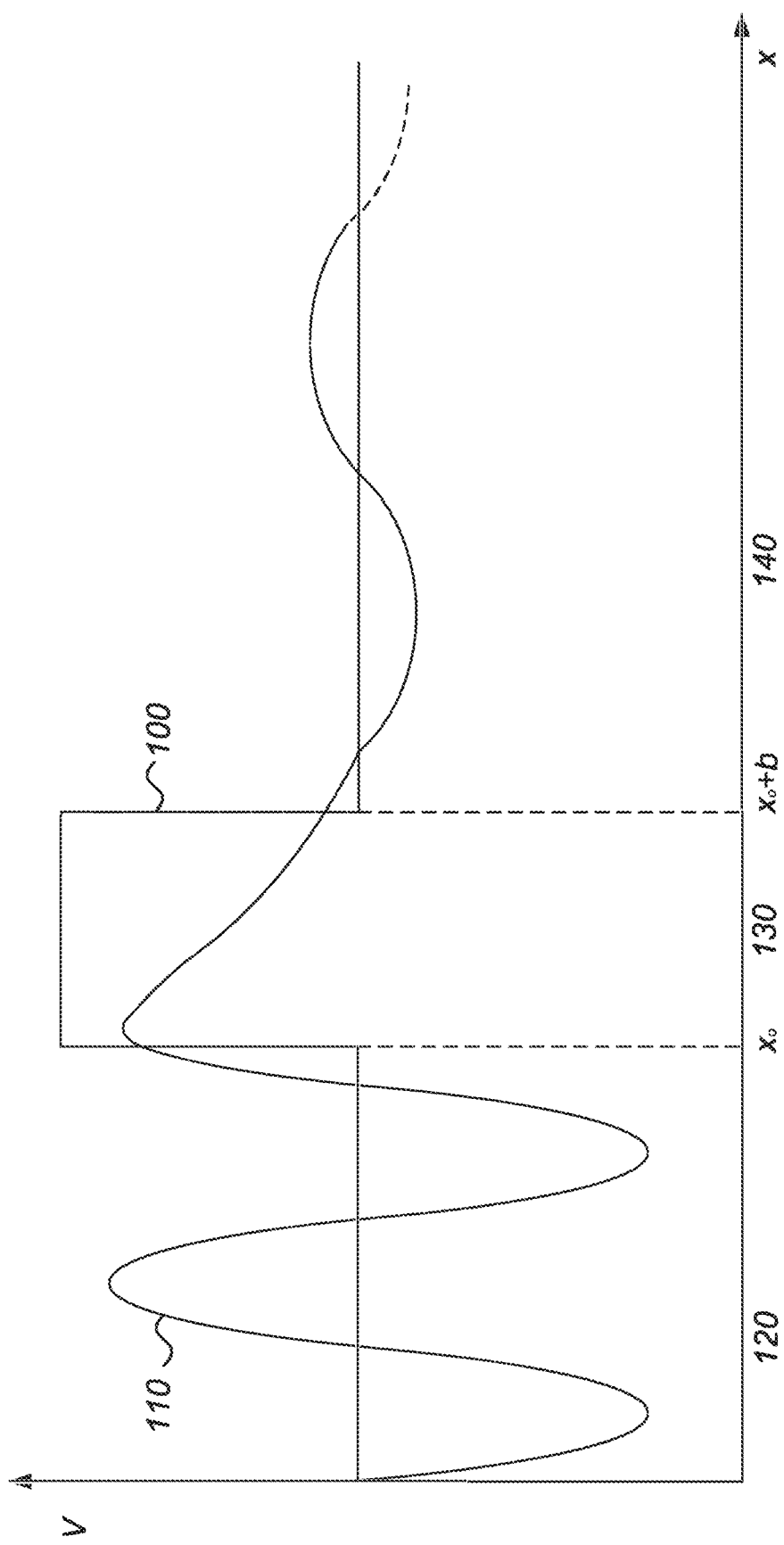
FIG. 1 illustrates a one dimensional wavefunction of a particle tunnelling through a quantum tunnelling barrier.

The present invention seeks to provide novel/improved methods for determining a unique identifier of a device, and appropriate apparatuses and devices for performing said methods. Whilst various embodiments are described below, the invention is not limited to these embodiments, and variations of these embodiments may well fall within the scope of the invention which is to be limited only by the appended claims.

In what follows, terms such as "device" and "apparatus" are to be considered as interchangeable and, in some places, have been used interchangeably where the context allows.

Often, for clarity, "device" has been used to describe an object comprising a quantum tunnelling barrier, and "apparatus" has been used to describe an object including a quantum tunnelling barrier and a processor. However, these terms are to be considered as interchangeable, for example a "device" may further comprise a processor and an "apparatus" may or may not comprise a processor. A device/apparatus may comprise, for example, one or more electronic components, an integrated chip, a computing device, a server, a mobile or portable computer or telephone, and so on. A device/apparatus may comprise a PUF.

In what follows, the terms physically unclonable function, physical unclonable function, and PUF are used interchangeably. A PUF comprises an object that performs a functional operation, i.e. when queried with a certain input a PUF produces a measurable output. A PUF is not a true function in the mathematical sense, as an input to a PUF may have more than one possible output. Typically, an input to a PUF is referred to as a "challenge" and the resultant output of the PUF is referred to as a "response". An applied challenge and its measured response is known as a "challenge-response pair" or "CRP". In a typical application scenario, often referred to as "enrolment", one or more challenge-response pairs are gathered from a particular PUF and stored in a corresponding database. In another typical application scenario, often referred to as "verification" or "authentication", a challenge from the database is applied to the PUF and the response produced by the PUF is compared with the corresponding response from the database. A PUF that can only be interrogated by one or a small number of challenges may sometimes be referred to as a "Physically Obfuscated Key" or "POK".

A PUF should be largely invariant to environmental conditions such that its response to any given challenge can be predicted by a valid authenticator having knowledge of a corresponding CRP. This idea is largely captured by the concept of an "intra-distance" between two evaluations on one single PUF instantiation, which is the distance between the two responses resulting from applying a particular challenge twice to the same PUF. One instantiation of a PUF should also be clearly differentiable from another. For a particular challenge, the "inter-distance" between two PUF instantiations is the distance between the two responses resulting from applying the challenge once to both PUF instantiations. The distance measure used can vary depending on the nature of the response—for example, when the response is a bit string, the Hamming distance may be used. Desirably, PUFs should have small intra-distances and large inter-distances.

In relation to integrated circuits (ICs), a PUF is a pseudorandom function that exploits the random disorders in the integrated circuits' (complementary metal-oxide-semiconductor—"CMOS") fabrication process to generate random and unique identifiers by physically reducing the IC's microstructure to a fixed-length string.

To achieve higher integration density and performance, CMOS devices have been scaled downwards in size in recent years, to the extent that quantum mechanical effects are becoming more important to the operation of such devices. For example, due to this scaling down, current may flow through one or more components of a device even when the device is considered to be in an "off" state in which current should not classically be able to flow. Such quantum mechanical effects, including leakage currents, are usually considered as losses in such systems, for example a leakage current in a transistor is often seen as a limitation on the control over that transistor. Accordingly, as CMOS devices and ICs have become smaller and smaller, there has been a tendency to try to mitigate, correct for, or eliminate such seemingly detrimental effects.

The inventors have recognised that, contrary to such quantum mechanical effects being considered as a loss or source of noise, quantum mechanical effects, and in particular quantum tunnelling, in devices such as CMOS devices may be utilised as a useful cryptographic primitive. In particular, such quantum mechanical effects are based on the nanoscale or atomic scale properties of the underlying device and the inventors have further recognised that, as such, these quantum mechanical effects may be used to uniquely identify the underlying device. That is, such quantum mechanical signatures may be used to describe a physically unclonable function or physically obfuscated key.

The methods of determining/generating/verifying a unique identifier for a device as described herein rely on quantum tunnelling effects. The inventors have, in particular, recognised that a quantum tunnelling current through a quantum tunnelling barrier uniquely characterises the quantum tunnelling barrier itself and is, unlike devices which utilise quantum confinement, largely invariant to environmental effects and in particular external temperature. The methods and devices disclosed herein are therefore able to provide a robust identifier or signature for a device. Accordingly, the inventors have recognised that by analysing quantum tunnelling currents, one may implement a PUF or POK.

The principle underlying the methods described herein will now be described with reference to FIG. 1, which demonstrates the effect of an energy potential V provided by a quantum tunnelling barrier 100 on a particle's wavefunction 110.

In the macroscopic world, when an object hits an obstacle its path is blocked unless it has enough energy to pass through the obstacle. In the microscopic world, however, it is possible for an object to pass through an obstacle or barrier even though the object does not have the classically required energy. Quantum mechanics can tell us with what probability an object may be found on the far side of an obstacle that it classically should not be able to pass through. The process by which this occurs is a random process known as quantum tunnelling.

If a charged particle, such as an electron, moves through a barrier that it classically should not be able to pass through, this movement of charge gives rise to a tunnelling current. Electrons have wavelike properties and can be described by a wavefunction 110, which in the example shown in FIG. 1 is a one-dimensional wavefunction $\psi(x)$.

In region 120 of FIG. 1 ($x<x_0$), the energy E of an electron is greater than the potential energy V(x) of its surroundings (i.e. the electron is free to travel as there is no quantum tunnelling barrier in this region) and accordingly in the figure the wavefunction 110 has a first form.

In region 130 of FIG. 1, between $x_0$ (the position at which a classical particle would be reflected) and $x_0+b$, where b is the thickness of a quantum tunnelling barrier 100, the energy E of an electron is less than the energy V(x) of the barrier.

The transmission amplitude provided by the wavefunction 110 during tunnelling is proportional to:

$$\exp\left[-\frac{1}{\hbar}\int_{x_0}^{x_0}\sqrt{2m(V(x)-E)}\,dx\right]$$

where $x_0$ is the classical turning point, m is the mass of the particle, and $\hbar=h/2\pi$ where h is Planck's constant. The probability of finding the particle on the other side of the barrier (region 140 in which the energy E of an electron is again greater than the potential energy V(x)) is proportional to the square of this amplitude:

$$\exp\left[-\frac{2}{\hbar}\int_{x_0}^{x+b}\sqrt{2m(V(x)-E)}\,dx\right]$$

where b is the width of the barrier 100. Because of the sharp decay of the probability function through the barrier, the number of electrons that will actually be found to have tunneled through the barrier is dependent upon the thickness or width of the barrier 100.

In practice, the quantum tunnelling barrier 100 may take any suitable form so long as the barrier has a spatial dimension at or below a length scale corresponding to the de Broglie wavelength of the particle of interest. For example, the barrier 100 may comprise a nanoscale dielectric, air, vacuum or other media. Further examples will be provided below.

As will be appreciated by the skilled person, the potential barrier 100 of FIG. 1 is presented in a simplified form as a one dimensional potential barrier, for which the potential V(x) is a constant across its width. However, in practice even in the one-dimensional case, nanoscale or atomic scale structural features of the barrier, for example impurities in a dielectric from which the barrier is formed, will give rise to variations in the potential V(x) across its width, which in turn leads to a barrier-specific decay in the transmission amplitude of a particle such as an electron across the barrier. This in turn means that the tunnelling current resulting from tunnelling through the barrier is also affected by the intrinsic features of the barrier 100. Accordingly, a measured tunnelling current may be used to uniquely identify a quantum tunnelling barrier and any device in which such a quantum tunnelling barrier is located, for example a PUF. The skilled person would appreciate that the same considerations also apply to higher dimensional barriers, such as two-dimensional barriers, or three-dimensional barriers (for which the potentials can be described by multivariate functions V(x, y) and V(x, y, z) respectively).

As explained above, a PUF exploits the unique physical properties of a device which are usually introduced during manufacturing processes. Sources of variations between such devices will be explained further below in relation to CMOS devices and, in particular, to metal-oxide-semiconductor field-effect transistors (MOSFETs) or metal-insulator-semiconductor field-effect transistors (MISFETs), although the skilled person will appreciate that these sources of variation are also relevant to other structures and devices/apparatuses.

Figure 2:
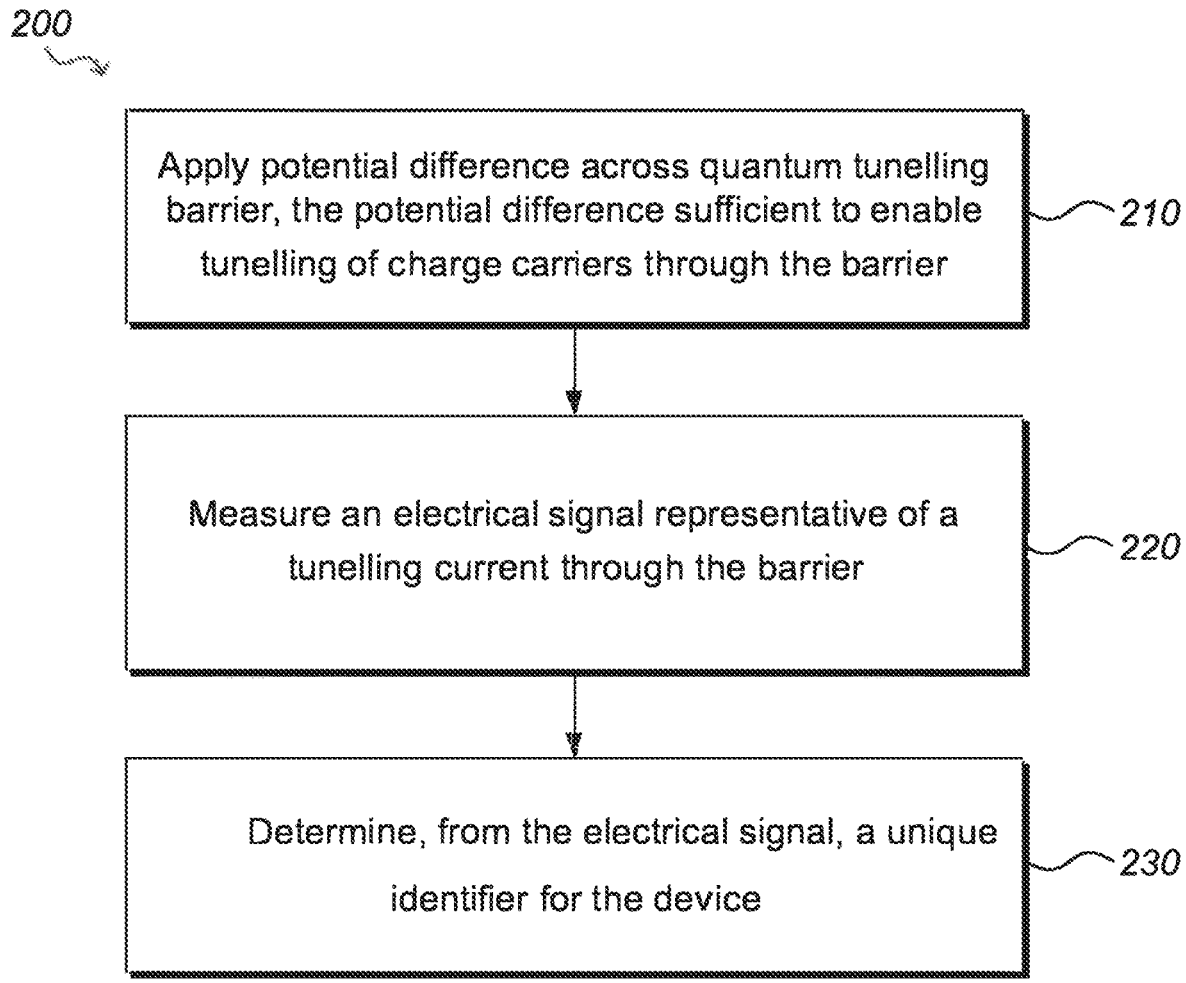
FIG. 2 shows a flow chart of a method for determining a unique identifier of a device.

FIG. 2 is a flowchart of a method for determining a unique identifier for a device/apparatus, the device including a quantum tunnelling barrier 100. As explained above, due to the inherent uniqueness of a quantum tunnelling barrier, the quantum tunnelling barrier is physically unclonable and unique to the device.

At step 210, the method comprises applying a potential difference across the quantum tunnelling barrier, the potential difference sufficient to enable tunnelling of charge carriers through the quantum tunnelling barrier. The potential difference may be below a threshold voltage for which current would classically be able to pass through the barrier 100. In the terminology of PUFs, said applied potential difference may be considered as a challenge.

At step 220, the method comprises measuring an electrical signal, the electrical signal representative of a tunnelling current through the quantum tunnelling barrier 100. The tunnelling current is characteristic of the quantum tunnelling barrier 100. Measuring the electrical signal may comprise directly measuring the tunnelling current using, for example, an ammeter.

At step 230, the method comprises determining, from the measured electrical signal, a unique identifier for the device. In the terminology of PUFs, said unique identifier may be considered as a response. Determining the unique identifier for the device may comprise determining the mean tunnelling current. The determined unique identifier may be stored for future use, or may be used to verify the identity of the device.

The method may be performed by the device or by a separate apparatus or controller able to act upon the device. The method may be performed by a single processor or by a plurality of processors. For example, a processor of the device to be identified may perform steps 210 and 220, and communicate the measurements to a second processor, optionally in a second device, to perform step 230. That is, the method may be performed by, for example, a single processor or by a distributed computing system.

In order to determine a unique identifier for the device, post-processing may occur. For example, a further method or process may be applied to the measured electrical signal in order to determine the unique identifier. For example, a bit string derived from the measured electrical signal may be input into a cryptographic hash function to determine the unique identifier.

Figure 3:
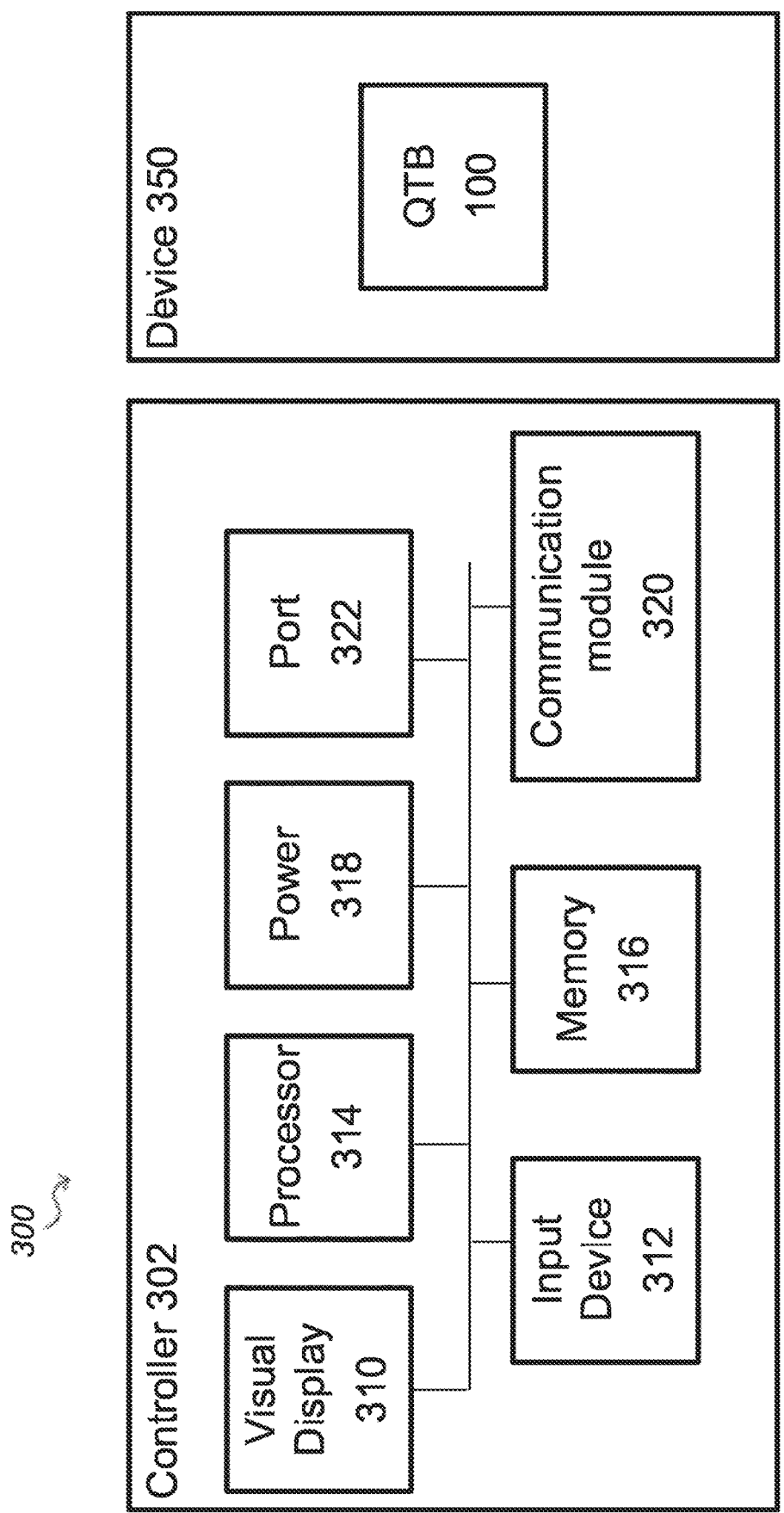
FIG. 3 shows a block diagram of an authentication system.

FIG. 3 is a block diagram of an authentication system 300 in accordance with an embodiment of the invention. FIG. 3 shows in particular an electronic apparatus or controller 302 communicably and electronically coupled to a device 350. The controller 302 is suitable for determining a unique identifier of the device 350, for example by using a method such as that described above in relation to FIG. 2. The device 350 comprises a quantum tunnelling barrier 100, which is physically unclonable and unique to the device 350. The device 350 may be any suitable device having a quantum tunnelling barrier and couplable to components of the controller 302. Other architectures to that shown in FIG. 3 may be used as will be appreciated by the skilled person.

In the figure, the device 350 is shown as a separate entity to the controller 302. To this end, the device may be a passive device which provides a response to a challenge received from the controller, such as a separate circuit or even a particular component having a quantum tunnelling barrier, such as a MOSFET. In this case, the controller 302 can be thought of as an authenticator which may communicate with the device 350 for enrolment or verification of the device 350.

Referring to the figure, the controller 302 includes a number of user interfaces including visualising means such as a visual display 310 and a virtual or dedicated user input device 312. The controller 302 includes a processor 314, a memory 316 and a power system 318. The controller 302 comprises a communications module 320 for sending and receiving communications between processor 314 and remote systems. For example, communications module 320 may be used to send and receive communications via a network such as the Internet.

The controller 302 comprises a port 322 for receiving, for example, a non-transitory computer-readable medium containing instruction to be processed by the processor 314.

The processor 314 is configured to receive data, access the memory 316, and to act upon instructions received either from said memory 316, from communications module 320 or from user input device 312.

In particular, the processor 314 is configured to cause a potential difference to be applied across the quantum tunnelling barrier 100, the potential difference sufficient to enable tunnelling of charge carriers through the quantum tunnelling barrier 100. The potential difference may be applied using, for example, the power supply 318 of the controller, or by communicating via communications module 320 to the device 350 to cause an (optional) dedicated power source of the device 350 or some other source of electrical charge to apply the potential difference across the quantum tunnelling barrier 100.

The processor 314 is further configured to measure an electrical signal, the electrical signal representative of a quantum tunnelling current through the quantum tunnelling barrier 100 and characteristic of the quantum tunnelling barrier 100.

The processor is further configured to determine, from the measured electrical signal, a unique identifier for the device 350. It may be that the processor 314 is for determining the unique identifier for the device for later authentication purposes and so is arranged to store the unique identifier in memory, such as memory 316. Additionally, or alternatively, the processor 314 may be for authenticating the device 350, and so is arranged to compare the determined unique identifier with a database of unique identifiers in memory 316 in order to establish whether the identity of the device 350 has been verified.

Although FIG. 3 has been described with reference to a controller 302, the skilled person would appreciate that the controller may comprise any suitable computing device, for example a server or mobile electronic device.

The device 350 of FIG. 3 has been described as a passive device, by which a processor 314 of a separate controller 302 performs a method such as that described in relation to FIG. 2 to determine the unique identifier of the device 350. The device 350 of FIG. 3 may be, for example, an electronic component such as a transistor which includes a quantum tunnelling barrier, or some other passive device.

The device 350 has many uses, such as tagging an object. For example, device 350 may be built or installed into an object. A controller 302, possibly in the form of a mobile device may then be used to identify the object by verifying the tag.

Figure 4:
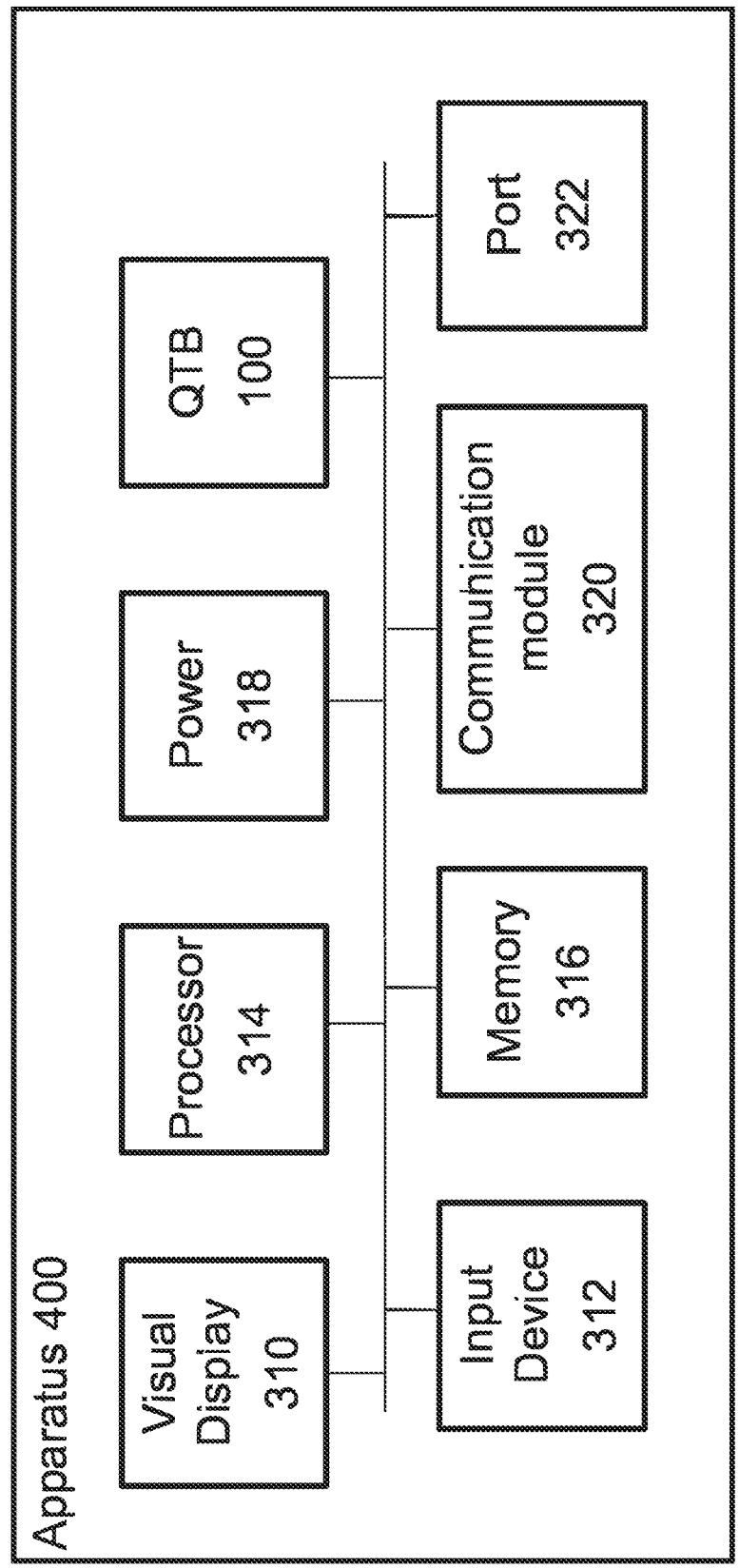
FIG. 4 shows a block diagram of an apparatus or device including a quantum tunnelling barrier.

The skilled person would also appreciate that different architectures may be used, such as electronic apparatus 400 of FIG. 4, in which a processor 314 of the apparatus 400 is configured to perform at least a part of a method such as that described above in relation to FIG. 2. Electronic apparatus 400 may comprise, for example, a mobile device such as a mobile phone or PC.

In FIG. 4, the quantum tunnelling barrier 100 is installed within the electronic apparatus 400 (possibly as part of an internal component arranged for identification of the apparatus 400). The other components of electronic apparatus 400 are configured to perform a similar function to their counterparts in FIG. 3 and accordingly have been numbered similarly.

The quantum tunnelling barrier 100 of FIG. 4 is installed within the apparatus 400 and so may be used to provide an identifier of the apparatus 400.

The apparatus 400 is configured to communicate (via communications module 320) with third parties (for example a server or other electronic apparatus). In some scenarios, a third party may require the apparatus 400 to identify itself. The processor 314 of apparatus 400 is configured to cause a potential difference to be applied across the quantum tunnelling barrier 100, the potential difference sufficient to enable tunnelling of charge carriers through the quantum tunnelling barrier 100. The processor 314 is further configured to measure an electrical signal, the electrical signal representative of a quantum tunnelling current through the quantum tunnelling barrier 100 and characteristic of the quantum tunnelling barrier 100.

The processor is configured to communicate the measured electrical signal to the third party, and the third party (or, more precisely, a processor installed thereon), is configured to determine, from the measured electrical signal, a unique identifier for the apparatus 400. Alternatively, the processor 314 is configured to determine the unique identifier from the measured signal and may communicate the identifier to a third party.

The skilled person would understand that the examples described above in relation to FIGS. 3 and 4 are not limiting and that other architectures are possible. For example, a device/apparatus comprising the quantum tunnelling barrier may comprise, for example, an integrated circuit (IC) or microchip. The components shown in FIGS. 3 and 4 are not limiting. The skilled person would appreciate that any suitable combination of components may be used, for example an apparatus/device may or may not comprise one or more of the user input device 312, a visual display 310, or a memory 316, a power supply or a port 322.

Further detail will now be provided in relation to FIGS. 5-8. In particular, the following discussion relates to semiconductor devices, components, articles or apparatuses and, in particular, transistor devices.

Figure 5:
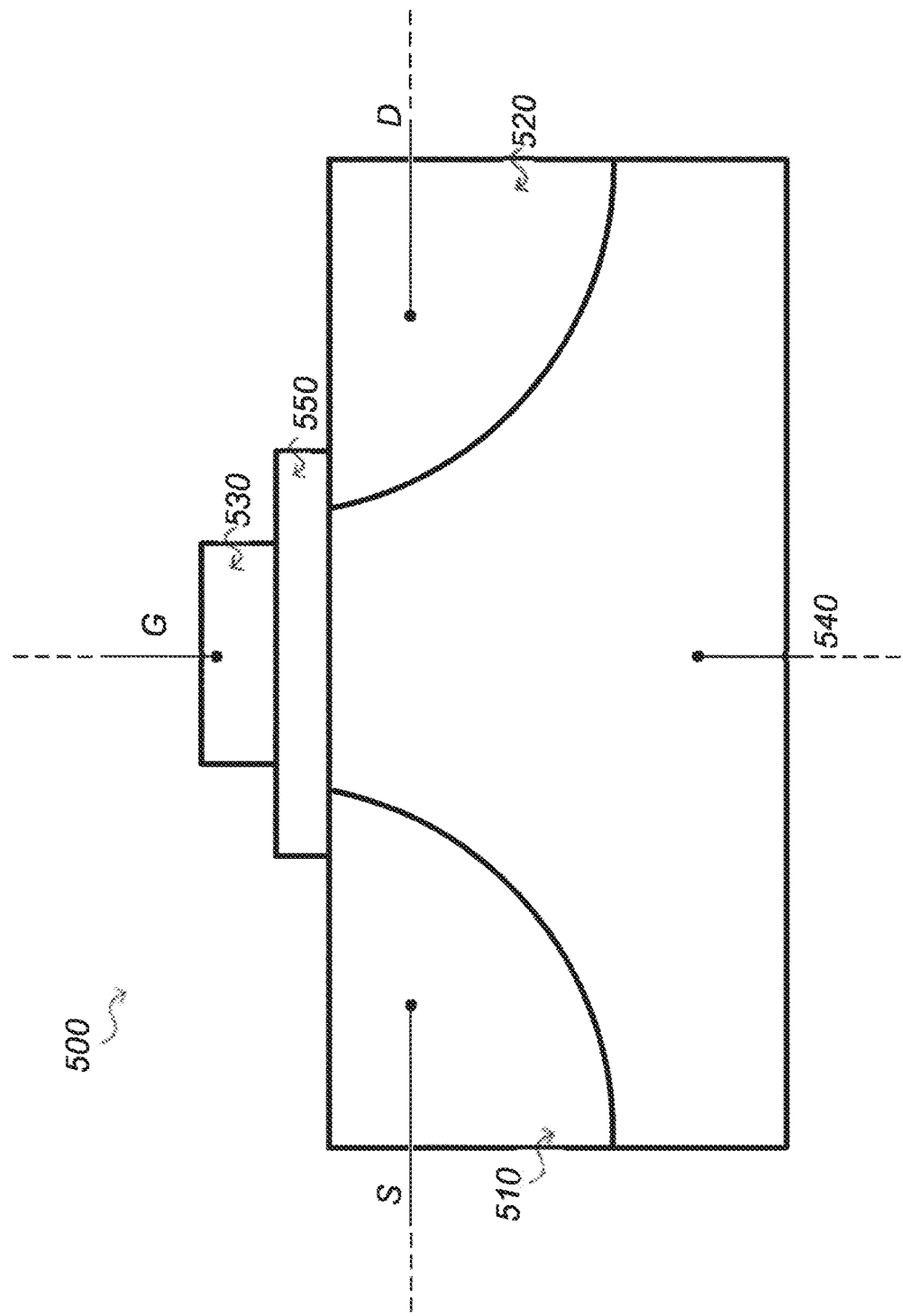
FIG. 5 is a schematic of a transistor device.
Figure 6A:
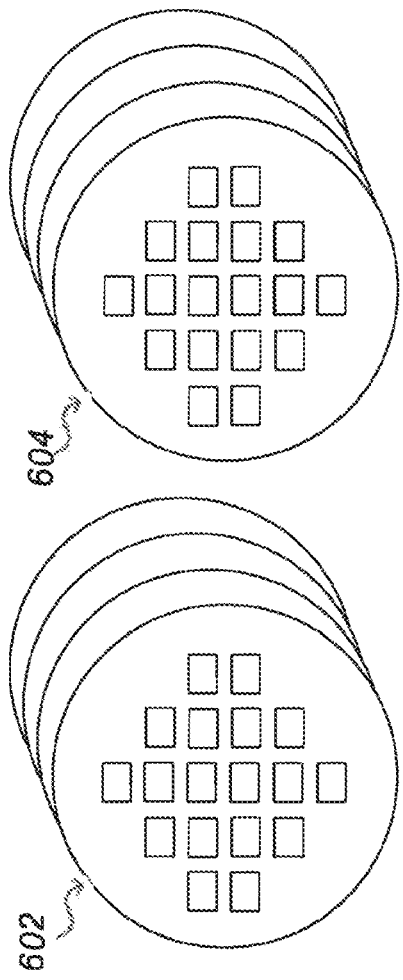
FIG. 6A illustrates lot-to-lot variation.
Figure 6B:
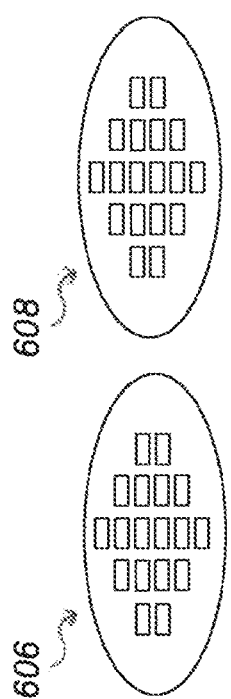
FIG. 6B illustrates wafer-to-wafer variation.
Figure 6C:
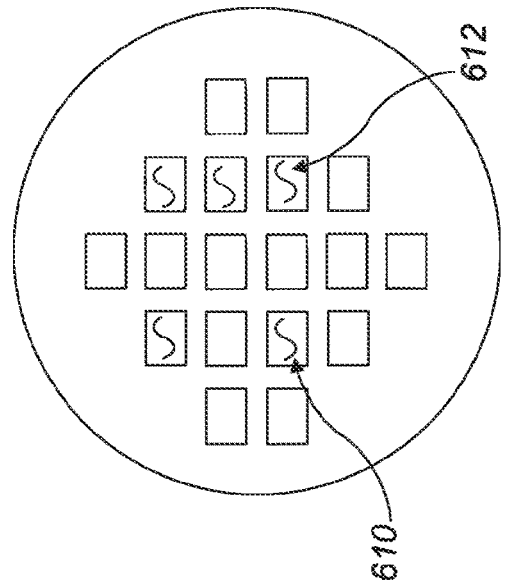
FIG. 6C illustrates chip-to-chip variation and FIG. 6D illustrates on-chip variation.
Figure 6D:
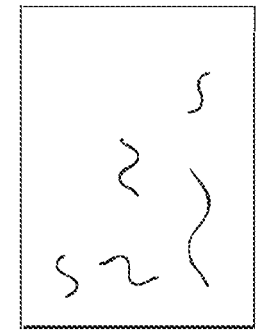

FIG. 5 is a schematic of a transistor device 500 such as a MOSFET or MISFET. The device 500 comprises a source terminal 510, a drain terminal 520, a gate terminal 530, and a body 540. The gate terminal 530 is separated from the source terminal 510 and the drain terminal 520 by an insulating layer 550. The transistor device 500 is small such that the insulating layer 550 has a nanoscale thickness such that it acts as a quantum tunnelling barrier 100.

The transistor device 500 has an electronically variable width of a channel along which charge carriers (electrons or holes) flow between the source terminal and drain terminal. The width of the channel is controlled by the voltage on the gate terminal 530 which is located between source 510 and drain 520.

As has been mentioned above, as devices such as device 500 are made smaller, insulating layers such as insulating layer 550 are made thinner until at the nanoscale, quantum tunnelling of charge carriers through the insulating layer 550 may occur. In particular, in a transistor device 500, the tunnelling is through the insulating layer 550 to the gate terminal 530 (or vice versa). This effect is sometimes referred to as gate leakage current and efforts in recent years have been made to reduce this leakage by, for example, attempting to use thicker insulator layers or use insulating materials with a higher dielectric constant. The inventors have, however, recognised that the gate leakage current is unique to the device and can be used to determine a unique identifier of the device.

The gate leakage current is strongly correlated with the thickness (oxide thickness) of the insulator layer 550. A large (for example, greater than 3 nm) oxide thickness results in less quantum tunnelling of electrons, hence a low gate leakage current. On the other hand, gate leakage current increases significantly in the case of a thin oxide causing more electrons to tunnel. Gate leakage current increases exponentially with decreasing oxide thickness.

It is known that the oxide thickness varies on a lateral scale of 1 to 30 nm as well as on lateral scales of hundreds of nanometres. This variation is a random source of fluctuations. The thickness fluctuations are associated with the $Si/SiO_2$ interface roughness leading to tunnelling current density fluctuations of several orders of magnitude. Therefore, the gate leakage/quantum tunnelling current of the device 500 is unique and is not physically replicable by another device.

The transistor device 500 may be manufactured by any suitable process, such as growing a layer of silicon dioxide ($SiO_2$) on top of a silicon substrate and depositing a layer of metal or polycrystalline silicon. Multiple transistor devices may be manufactured on a wafer or substrate, each transistor device having a unique quantum tunnelling barrier.

The unique tunnelling characteristics of the quantum tunnelling barrier 550 of the device 500 arise from deviations from the nominal characteristics of a device that arise during manufacture of the device.

Process variability is the naturally occurring variation in attributes of semiconductor devices such as transistors when integrated circuits (IC) are fabricated. The amount of process variation is particularly relevant at small scales, where the variation may be a large percentage of the full length or width of the component and as feature sizes approach fundamental dimensions such as the size of atoms and the wavelength of light for patterning lithography masks. Process variability can be environmental, temporal, or spatial. Spatial variations cause performance differences among devices, the differences dependent on the distances between the devices or the locations of the devices on, for example, an IC.

Typical spatial variations, such as line width or film thickness non-uniformity, universally exist across lots, across wafers (also known as slices or substrates), across chips and dies, and between circuit blocks and devices (see FIG. 6). That is, during the manufacture of a CMOS device, variations from nominal device characteristics of a device will creep in due to lot-to-lot variations, wafer-to-wafer variations, chip-to-chip variations, and on-chip variations such as within-die variations. FIG. 6a shows lot-to-lot variation (602, 604); FIG. 6b shows wafer-to-wafer variation (606, 608); FIG. 6c shows chip-to-chip or across-wafer variation (612, 614), and FIG. 6d shows within-chip variation.

Spatial variations can be further classified into systematic and random variations. Systematic variations are repeatable deviations from nominal device characteristics that depend on the device's spatial position due to the nonidealities of the lithographic system, chamber effects, optical proximity effects and strained silicon effects. Random variations on the other hand, are unpredictable components of device variability, such as non-uniformities resulting from random fluctuations in the fabrication process, microscopic fluctuations of the number and location of dopant atoms in a semiconductor channel (for example, in the channel between source and drain electrodes of a MOSFET), referred to as random dopant fluctuations (RDF), line-edge-roughness (LER), and atomic-scale oxide-thickness variation (OTV) due to interface roughness, for example, Si/SiO$_2$ interface roughness.

Random dopant fluctuations (RDFs) are a large source of random variation in modern CMOS processes and result from variation in the implanted impurity concentration. In particular, random dopant fluctuation refers to the random variations in the number and locations of dopant atoms in a material such as a metal-oxide semiconductor, for example in a channel region in a MOSFET. Random dopant fluctuations locally modulate the electric field and electron density in the material, to which the direct tunnelling current through the material is very sensitive and so leads to a measurable source of variation between devices. In a MOSFET, this means that RDFs have a large effect on gate leakage currents which result from quantum tunnelling through gate oxides. RDFs also cause disparities between devices of other electrical properties, such as the threshold voltage ($V_t$), short channel effect, and drain-induced barrier lowering (DIBL). With the gate length scaling down to sub-100 nm, the total number of dopant atoms under the gate is reduced to thousands or even hundreds, leading to significant variations in the threshold voltage and drive current for the transistor device.

For very small structures, for example a length of 100 nm or less, not only the discreteness of the dopant charge, but also the atomicity of matter introduces substantial variation in the individual device characteristics. For example, in a MOSFET, a gate oxide thickness at 25 nm is equivalent to a few silicon atomic layers with a typical interface roughness of one to two atomic layers. This introduces more than a 50% variation in the oxide thickness for a process with a 1 nm gate oxide/insulator layer.

As there is an exponential dependence of the gate leakage current (gate tunnelling current) on the gate oxide thickness, the oxide thickness variation (OTV) in a transistor device 500 also leads to differences in gate leakage currents between devices. Gate oxide thickness can vary on a lateral scale of hundreds of nm, as well as on a much smaller lateral scale of 1 to 30 nm. The thickness fluctuations on a smaller lateral scale are associated with Si/SiO$_2$ interface roughness, leading to a deviation from the nominal oxide thickness by one Si(001) inter-atomic plane distance. For a 1-1.5 nm thick SiO$_2$ gate dielectric, such thickness fluctuations lead to local tunnelling current density fluctuations of orders of magnitude, which increases the mean of the total tunnelling current, relative to that of a uniform device.

The combined effects of RDFs and OTV greatly affect the gate leakage current variability. At high gate bias, gate leakage variability is dominated by the effects of oxide thickness variation, and discrete doping atoms have a negligible impact. This can be explained because at high gate bias, the excess electron charge in the substrate screens the bare potential of the ionised impurities, and the RDF induced fluctuations of the tunnelling current density become too localised, compared to the OTV induced fluctuations.

Line-edge roughness (LER) is another source of intrinsic gate leakage variability. Line edge roughness is caused by the tendencies of lithographic photoresists to aggregate in polymer chains. These aggregates are large enough to locally affect the speed of the resist development process, which translates to a loss of resolution and low fidelity of the line edge. This is of importance for the formation of the gate pattern, and translates to an uncertainty of the gate length along the width of the device. Although the leakage gate current is linearly proportional to the gate dimensions, it must be kept in mind that the distribution of random impurities forming the source and drain extension is correlated to the gate line edge roughness.

In MOS structures, such as in device 500, one may distinguish three different quantum tunnelling processes such as Fowler-Nordheim tunnelling, direct tunnelling, and trap-assisted tunnelling.

In direct tunnelling, charge carriers can tunnel directly through the potential barrier that is formed by the conducting band. The significance of direct tunnelling is exponentially dependent to the thickness of the oxide (e.g. insulator layer 550) and the oxide perpendicular field, but it is only linearly sensitive to the gate width and source/drain extension overlaps. Direct tunnelling may involve electrons tunnelling from the conduction band of the substrate to the conduction band of the gate terminal 530 (or vice versa) which is known as electrons in the conduction band (ECB), or electrons tunnelling from the valence band of the substrate to the conduct band of the metal which is known as valence band tunnelling (EVB).

The direct tunnelling current density can be modelled by $$J_{DT} = \frac{q^3}{16\pi^2 \hbar \phi_{ox}} \left(\frac{V_{ox}}{T_{ox}}\right)^2 \exp\left(\frac{\frac{4\sqrt{2m^*}\,\phi_{ox}^{3/2}}{3\hbar q}\left(1-\left(\frac{V_{ox}}{\phi_{ox}}\right)^{3/2}\right)}{\frac{V_{ox}}{T_{ox}}}\right)$$

where $J_{DT}$ is the direct tunnelling current density, $V_{ox}$ and $\phi_{ox}$ are the potential drop across the gate oxide and the tunnelling barrier height respectively, m* is the effective mass of an electron in the conduction band of silicon, and $T_{ox}$ is the oxide thickness.

The direct quantum tunnelling current is expressed as:

$$I_g = W \cdot L \cdot J_{DT}$$

where W and L are the effective transistor width and length respectively.

Furthermore, the quantum tunnelling current exhibits a weak temperature dependence because the electric field across the oxide does not strongly depend on temperature. Advantageously, this means that an identifier determined from a measured electrical signal representative of the quantum tunnelling current through an insulating layer 550 of a transistor device 500 is largely insensitive to temperature and thus is more reproducible than an identifier based on a mechanism that is temperature dependent.

Figure 7:
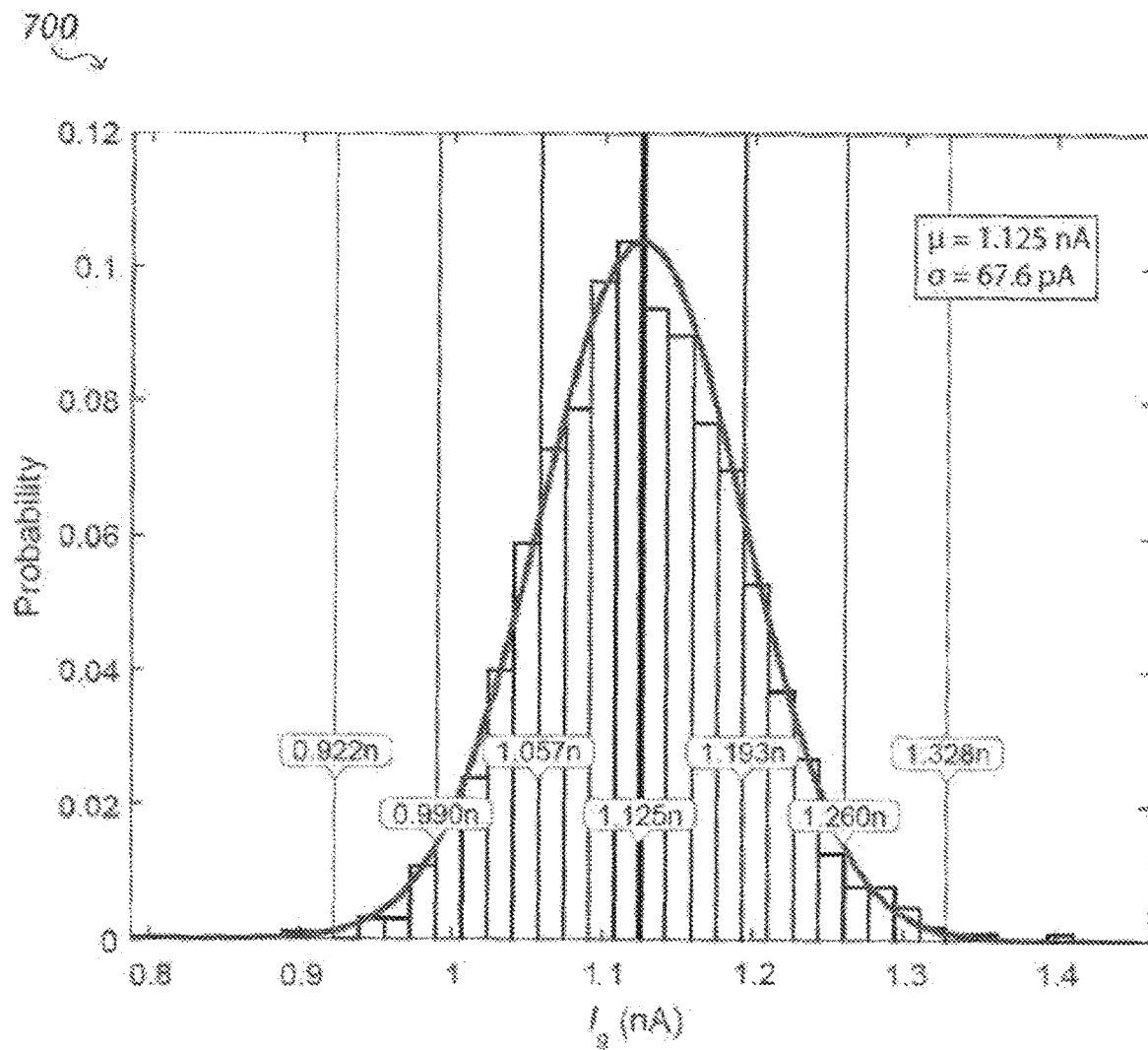
FIG. 7 shows a histogram of a Monte-Carlo simulation of gate leakage in a negative channel metal-oxide semiconductor transistor device.

FIG. 7 is a histogram of a Monte Carlo simulation (1000 runs) of gate leakage $I_g$ in nano-amperes (nA) for a 1 μm$^2$ thin-oxide low-threshold voltage NMOS (negative channel metal oxide semiconductor) with an area of 1 μm$^2$ using a process technology of 55 nm. The transistor device 500 was in the on state such that the gate voltage was set to $V_{DD}$, where $V_{DD}$ is the DC voltage that is supplied to the drain 520 of the transistor device 500, and $V_{DS}$ (the potential difference between the source terminal and the drain terminal) is zero. As shown in the figure, this device configuration generated a mean (μ) gate leakage current of 1.125 A and a standard deviation (σ) of 67.6 pA. A 3σ variation results in a variability which is almost 20% of the mean leakage making this transistor characteristic an ideal source of randomness to generate unique keys.

The curve represents a Gaussian distribution with μ=1.125 nA and σ=67.6 pA adjusted to fit the normalized probability histogram. In the probability histogram, the height of each bar is equal to the probability of selecting an observation within that bin interval. The distribution is a unique characteristic of the device. The mean may be used as an identifier of the device.

From the discussion above, it is clear that a transistor device 500 having a quantum tunnelling barrier 550 between the gate terminal and the source and drain terminals can be used to provide a unique identifier.

Figure 8:
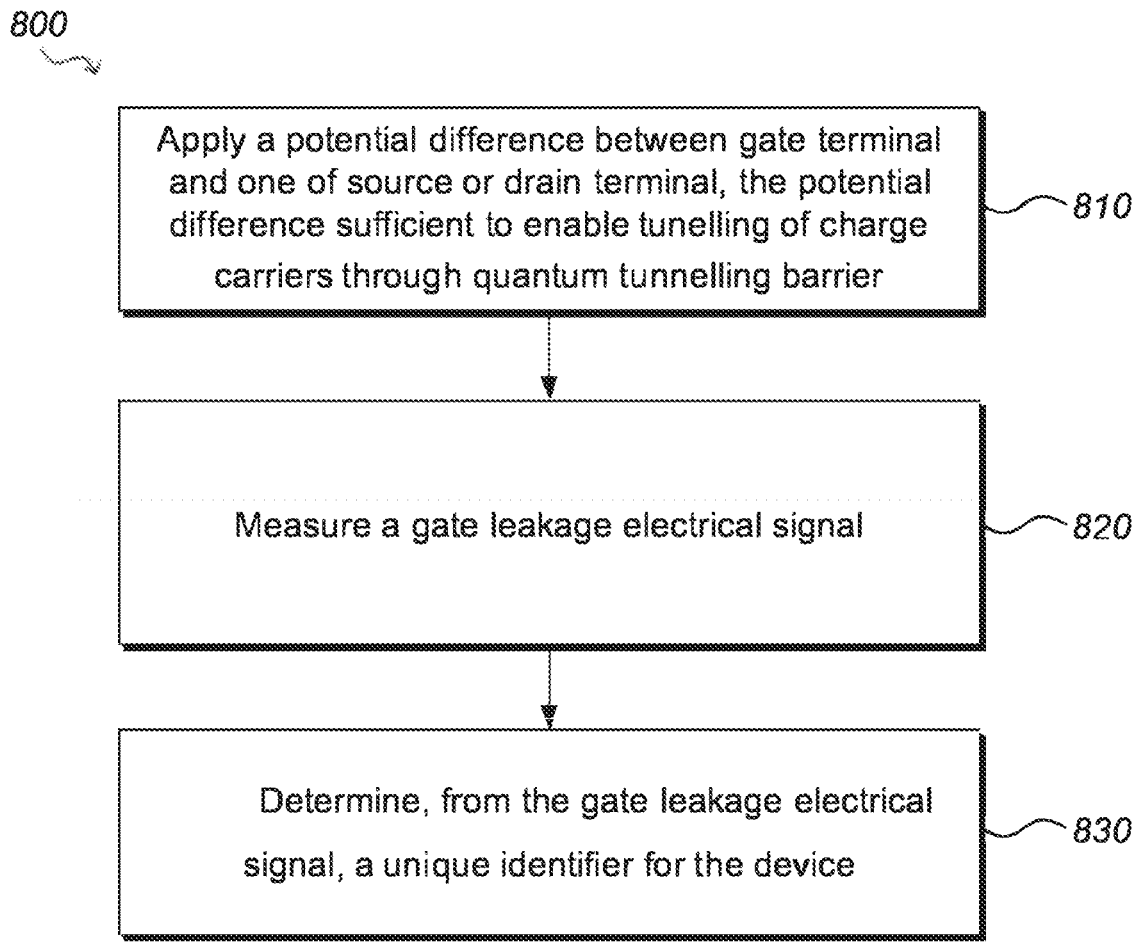
FIG. 8 shows a flow chart of a method for determining a unique identifier of a transistor device.

FIG. 8 is a flowchart of a method for determining a unique identifier of a transistor device 500, the transistor device 500 comprising a source terminal 510, a drain terminal 520 and a gate terminal 530, the gate terminal 530 separated from the source terminal 510 and the drain terminal 520 by a quantum tunnelling barrier 550, for example a gate oxide, which as described above is unique to the transistor device 500. A potential difference between the source 510 and the drain terminal 520 is arranged to be substantially zero, for example by earthing the source 510 and drain 520 terminals.

At step 810, the method comprises applying a potential difference between the gate terminal 530 and at least one of the source terminal 510 and the drain terminal 520, the potential difference sufficient to enable tunnelling of charge carriers through the quantum tunnelling barrier 550.

At step 820, the method comprises measuring a gate leakage electrical signal, the gate leakage electrical signal representative of a tunnelling current through the quantum tunnelling barrier 550, the tunnelling current characteristic of the quantum tunnelling barrier 550.

At step 830, the method comprises determining, from the measured gate leakage electrical signal, a unique identifier for the transistor device 500.

Figure 9:
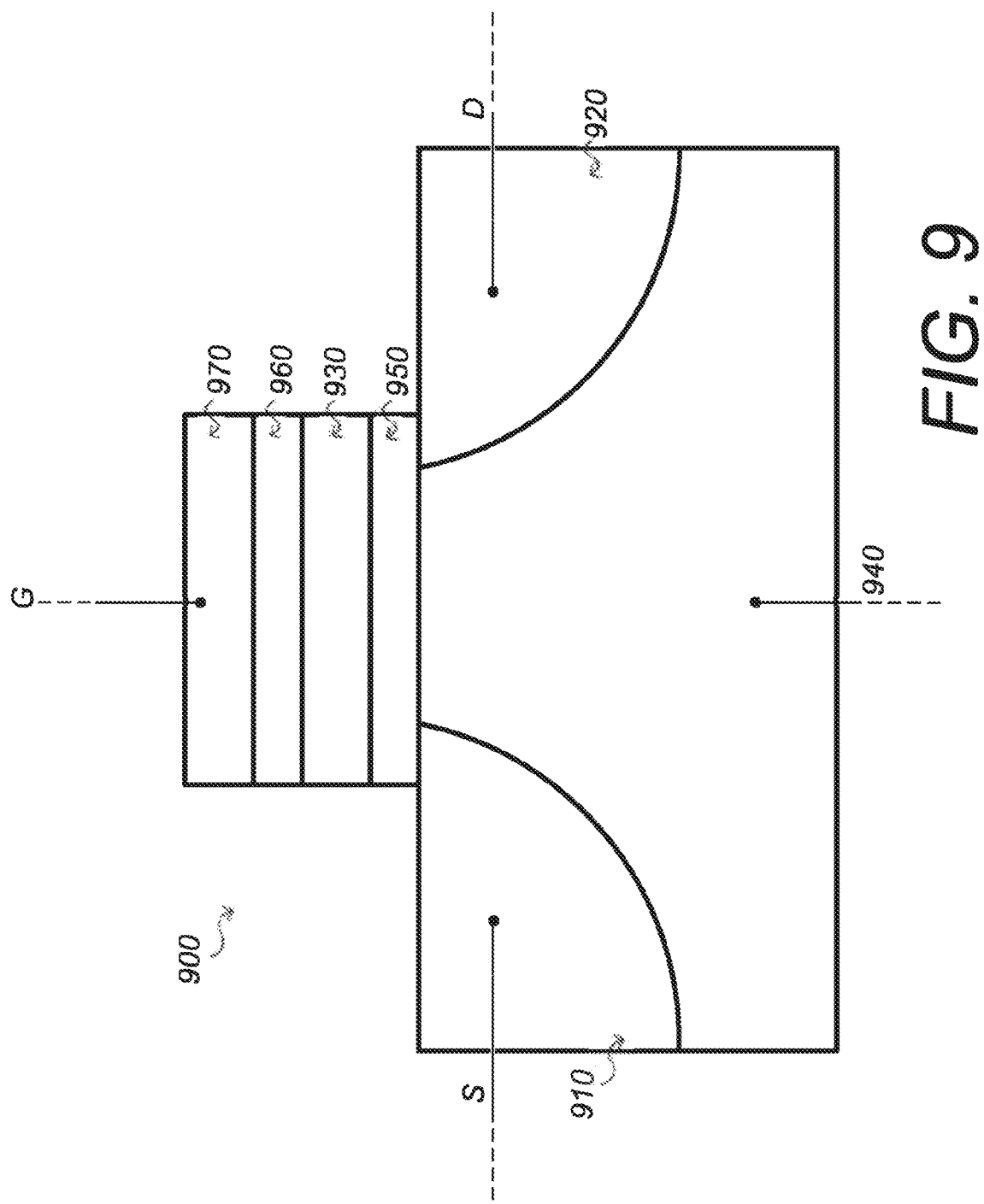
FIG. 9 is a schematic of a floating gate transistor device.

As an example, a transistor device may comprise a floating gate transistor device (see FIG. 9). A floating gate transistor device 900 comprises a source terminal 910, a drain terminal 920, a floating gate terminal 930, a control gate terminal 970 and a body 940. The floating gate terminal 930 and the control gate terminal 970 are separated by an insulating oxide layer which acts as a first quantum tunnelling barrier 960. The control gate is electrically connected to control the transistor device. The floating gate is separated from the source terminal and the drain terminal by a second quantum tunnelling barrier 950.

In use, a potential difference is applied between the control gate terminal 970 and at least one of the source and drain terminal, the potential difference sufficient to enable tunnelling through the second quantum tunnelling barrier 950 separating the source terminal 910, drain terminal 920 and transistor channel of the body 940 from the floating gate terminal 930. If the body comprises, for example, a p-doped semiconductor then when electrons tunnel to the floating gate, the floating gate becomes negatively charged and the threshold voltage of the transistor device 900 is increased. The threshold voltage distribution is representative of the current tunnelling through the second quantum tunnelling barrier 950 to the floating gate terminal 930, and so the threshold voltage is characteristic of the quantum tunnelling barrier 950. In use, the threshold voltage is measured.

The gate leakage current from the control gate terminal 970 is also measured. The gate leakage current is representative of a tunnelling current through the first quantum tunnelling 960 barrier and the second quantum tunnelling barrier 950. The gate leakage current and the threshold voltage may then be used to determine a unique identifier of the floating gate transistor device 900. In use, there is no quantum confinement in the device.

Figure 10:
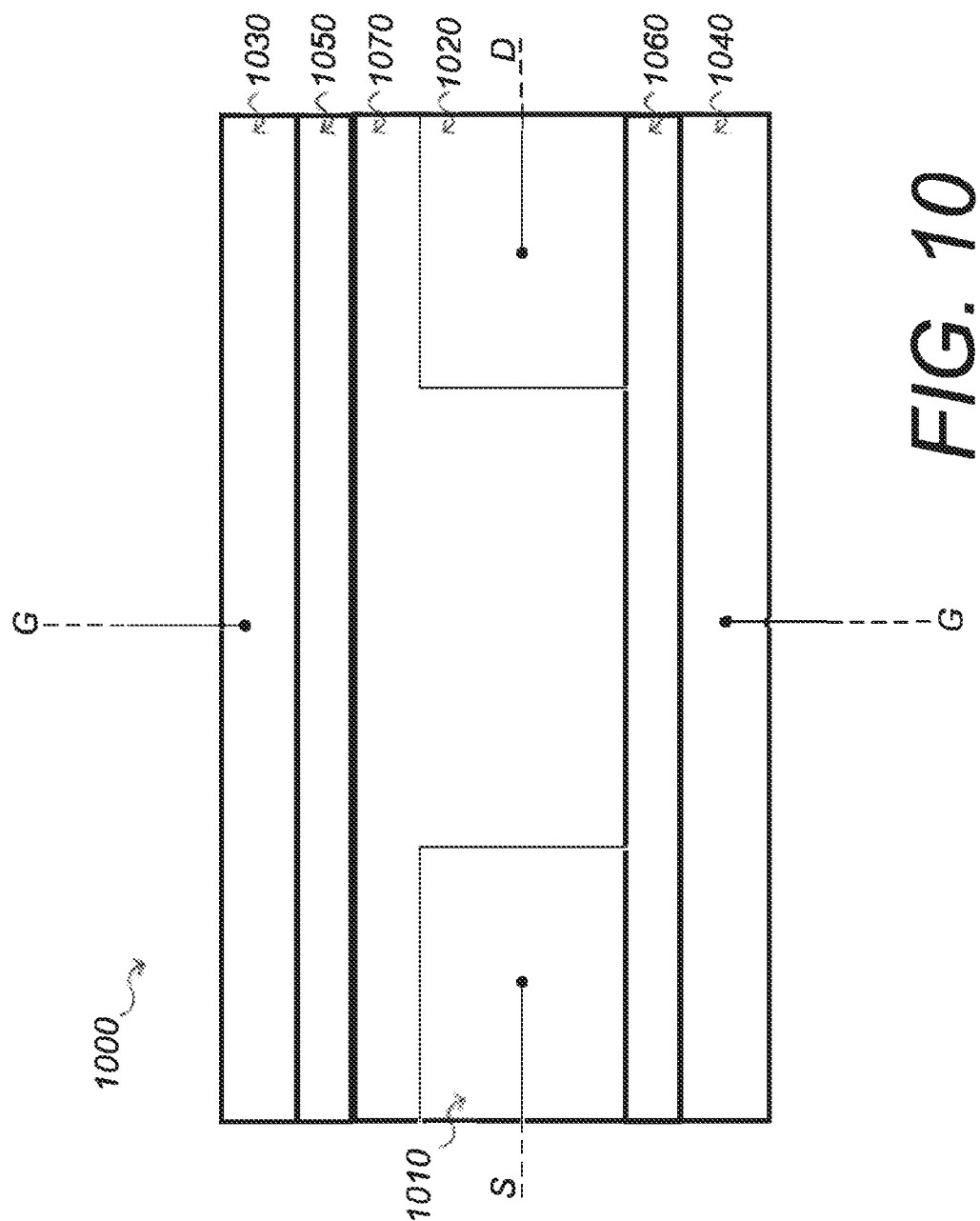
FIG. 10 is a schematic of a quantum dot transistor device.

As an example, a transistor device may comprise a quantum dot transistor device 1000 (see FIG. 10). The quantum dot transistor device comprises a source terminal 1010, a drain terminal 1020, and a quantum dot film 1070 separating the source terminal 1010 and the drain terminal 1020. The transistor device further comprises a first gate 1030 separated from the source and drain terminals (and in the figure also separated from the quantum dot film 1070) by a first quantum tunnelling barrier 1050. The transistor device 1000 further comprises a second gate terminal 1040 separated from the source terminal 1010 and the drain terminal 1020 by a second quantum tunnelling barrier 1060. In use, the source terminal 1010 and the drain terminal 1020 may be held substantially in equilibrium (i.e. the potential difference between the source terminal and the drain terminal 1020 may be substantially zero) and a potential difference may be applied between the first gate terminal 1030 and at least one of the source terminal 1010 and the drain terminal 1020. A gate leakage electrical signal from either or both of the first gate terminal and the second gate terminal 1040 may then be measured to determine a unique identifier for the quantum dot transistor device. In use, there is no quantum confinement in the device.

In order to construct such a quantum dot transistor device, the second gate terminal 1040 may comprise a highly doped semiconductor substrate and the second quantum tunnelling barrier may comprise a dielectric material. The source and drain contacts may be patterned onto the semiconductor substrate. The quantum dot film 1070 may be deposited using a variety of methods such as spin coating or drop casting to create a quantum dot channel between the source terminal 1110 and the drain terminal 1020. The quantum dot film adds to the inherent variability of the quantum dot transistor device due to the random nature of the deposition process, the quantum dots used and the treatment process that is undergone by the channel.

One or more dielectric layers may then be deposited on to the quantum dot film 1070 to form the first quantum tunnelling barrier 1050. The first gate terminal 1030 may comprise a metal. The skilled person will appreciate that the terms "first gate terminal" and "second gate terminal" may be used interchangeably—that is, the potential difference may be applied between the second gate terminal and the one or both of the source and drain terminals.

Variations of the described embodiments are envisaged, for example, the features of all of the disclosed embodiments may be combined in any way and/or combination, unless such features are incompatible.

A capacitor is an example of another device which may be used as or contribute to a PUF. There are many capacitor designs but in its simplest form a capacitor comprises two conductive plates separated by a dielectric medium. When the dielectric medium is sufficiently thin (for example an average thickness of less than 3 nm), the dielectric does not act as a perfect insulator and so a leakage current begins to flow. This small DC current flow in the region of nano-amps (nA) is based on quantum tunnelling. Leakage current is a result of electrons physically making their way through the dielectric medium and is often seen as an unwanted artefact as, over time, the capacitor will fully discharge if the supply voltage is removed. The inventors have though realised that the leakage current of a capacitor can be used to determine a unique identifier of that capacitor. Accordingly, a capacitor may also be used as a physically unclonable function or contribute to a physically unclonable function.

A quantum tunnelling barrier as described herein may be of any suitable thickness such that quantum tunnelling through the barrier can occur. For example, the quantum tunnelling barrier may be less than 5 nm, or less than 4 nm, or less than 3 nm, or less than 2 nm or less than 1 nm. The quantum tunnelling barrier may be formed of any suitable insulating material such as a dielectric oxide. Although silicon has been mentioned throughout this specification other materials may be used, such as II-V materials. In order to form the quantum tunnelling barriers, dielectrics with any suitable k-value may be used.

Throughout the specification, transistor devices have been described. The skilled person will appreciate that the transistor devices may be p- or/and n-doped transistor devices and that the dopant density of the devices can also be varied.

A device as described herein may be any suitable device, for example a metal oxide semi-conductor device, or a metal-insulator semiconductor device. A device may comprise a component, a chip, a computer, a tablet, a mobile phone or any other such device.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine-readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method for determining a unique identifier of a device, the device including a unique quantum tunnelling barrier, the method comprising:
   applying a potential difference across the quantum tunnelling barrier, the potential difference sufficient to enable tunnelling of charge carriers through the quantum tunnelling barrier;
   measuring an electrical signal representative of a characteristic of the tunnelling of charge carriers through the quantum tunnelling barrier; and
   determining, from the measured electrical signal, a unique identifier for the device.

2. The method according to claim 1, wherein the device includes a single quantum tunnelling barrier.

3. The method according to claim 1, wherein the quantum tunnelling barrier has an average thickness of less than or equal to five nanometres.

4. The method according to claim 1, further comprising providing the unique identifier for use in a communication protocol or a data transaction, optionally in encrypting or authenticating an aspect thereof, and/or providing the unique identifier as a digital identifier of a physical object or a digital object.

5. The method according to claim 1, further comprising using the unique identifier in a communication protocol or a data transaction and/or using the unique identifier as a digital identifier of a physical object or a digital object.

6. The method according to claim 1, wherein the characteristics of the quantum tunnelling barrier revealed by the measured electrical signal result from one or more distinctive nanoscale properties of the device that arise from device-to-device variability between ostensibly identical devices produced by the same semiconductor manufacturing process.

7. The method according to claim 6, wherein the distinctive nanoscale properties that are variable from device-to-device are beyond the control of a semiconductor manufacturing process used to produce the device.

8. The method according to claim 1, further comprising:
   applying a same potential difference across the quantum tunnelling barrier of an ostensibly identical second device,
   measuring an electrical signal representative of a second tunnelling current through the second quantum tunnelling barrier, and
   determining a second unique identifier for the ostensibly identical second device,
   wherein the electrical signals are representative of tunnelling currents through the quantum tunnelling barrier of the ostensibly identical first and second devices are different.

9. The method according to claim 1, further comprising comparing the unique identifier of the device with a database containing the unique identifier for the device and unique identifiers for other devices, wherein each of the other devices includes a quantum tunnelling barrier unique to that other device.

10. The method according to claim 1, further comprising, prior to applying the potential difference, receiving a challenge from a third party.

11. The method according to claim 10, further comprising communicating the unique identifier to the third party in response to the challenge.

12. The method according to claim 1, wherein the device comprises a physically unclonable function, and wherein the unique identifier is a unique identifier of the physically unclonable function.

13. The method according to claim 1, wherein determining a unique identifier for the device comprises determining a mean value of the tunnelling current.

14. The method according to claim 1, wherein measuring an electrical signal comprises measuring an electrical signal multiple times, and wherein determining a unique identifier for the device comprises interpolating a current spectrum from the multiple measurements of the electrical signal.

15. A non-transitory computer readable medium having instructions stored thereon which, when executed by a processor, cause the processor to determine a unique identifier of a device by performing a method according to claim 1.

16. A device comprising:
a first terminal and a second terminal;
a quantum tunnelling barrier unique to the device, the quantum tunnelling barrier located between the first terminal and the second terminal; and
a processor configured to:
apply a potential difference between the first terminal and the second terminal and across the quantum tunnelling barrier, the potential difference sufficient to enable tunnelling of charge carriers through the quantum tunnelling barrier;
measure an electrical signal representative of the tunnelling of charge carriers through the quantum tunnelling barrier; and
determine, from the measured electrical signal, a unique identifier for the device.

17. The device according to claim 16, wherein the device comprises a complementary metal-oxide-semiconductor, CMOS, chip.

18. The device according to claim 16, wherein the device comprises a single unique quantum tunnelling barrier.

19. The device according to claim 16, wherein the quantum tunnelling barrier has an average thickness of less than or equal to five nanometres.

20. The device according to claim 16, wherein the device further comprises a power supply for applying the potential difference.

* * * * *